(12) United States Patent
Suzuki et al.

(10) Patent No.: US 12,392,724 B2
(45) Date of Patent: Aug. 19, 2025

(54) MEASUREMENT DEVICE

(71) Applicant: HAMAMATSU PHOTONICS K.K., Hamamatsu (JP)

(72) Inventors: Kengo Suzuki, Hamamatsu (JP); Kenichiro Ikemura, Hamamatsu (JP); Kazuya Iguchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 69 days.

(21) Appl. No.: 18/285,298

(22) PCT Filed: Feb. 9, 2022

(86) PCT No.: PCT/JP2022/005179
§ 371 (c)(1),
(2) Date: Oct. 2, 2023

(87) PCT Pub. No.: WO2022/264495
PCT Pub. Date: Dec. 22, 2022

(65) Prior Publication Data
US 2024/0192139 A1    Jun. 13, 2024

(30) Foreign Application Priority Data
Jun. 18, 2021    (JP) .................. 2021-101384

(51) Int. Cl.
*G01N 21/64*    (2006.01)
*G01N 21/95*    (2006.01)

(52) U.S. Cl.
CPC ..... *G01N 21/6489* (2013.01); *G01N 21/6456* (2013.01); *G01N 21/9505* (2013.01)

(58) Field of Classification Search
CPC .......... G01N 21/6456; G01N 21/6489; G01N 21/9501; G01N 21/9505
See application file for complete search history.

(56) References Cited

U.S. PATENT DOCUMENTS

| | | | |
|---|---|---|---|
| 5,347,134 A | 9/1994 | Hashimoto et al. | |
| 6,870,684 B2 * | 3/2005 | Beatson | G02B 27/145 359/722 |

(Continued)

FOREIGN PATENT DOCUMENTS

| | | |
|---|---|---|
| CN | 101479593 A | 7/2009 |
| CN | 106233104 A | 12/2016 |

(Continued)

OTHER PUBLICATIONS

International Preliminary Report on Patentability mailed Dec. 28, 2023 for PCT/JP2022/005179.

(Continued)

*Primary Examiner* — Kevin K Pyo
(74) *Attorney, Agent, or Firm* — Faegre Drinker Biddle & Reath LLP

(57) ABSTRACT

A measurement device includes: an excitation optical system; an illumination optical system, and an image capturing unit. The illumination optical system includes a light transmission member having a central region that has a first color and a peripheral region that has a second color and surrounds the central region, and the excitation optical system and the illumination optical system are optically connected to each other such that in a field of view of the image capturing unit, an irradiation spot of the excitation light on the subject to be measured is included in a central spot region of the illumination light that has passed through the central region and is surrounded by a peripheral spot region of the illumination light that has passed through the peripheral region.

5 Claims, 17 Drawing Sheets

(56) References Cited

U.S. PATENT DOCUMENTS

| | | |
|---|---|---|
| 7,238,177 B2 | 7/2007 | Somani et al. |
| 2003/0202252 A1 | 10/2003 | Beatson et al. |
| 2013/0063714 A1 | 3/2013 | Izzia et al. |
| 2019/0195800 A1 | 6/2019 | Heine et al. |
| 2019/0219501 A1* | 7/2019 | Ohno .................. G01M 11/0207 |

FOREIGN PATENT DOCUMENTS

| | | |
|---|---|---|
| CN | 107167243 A | 9/2017 |
| JP | 2003-077141 A | 3/2003 |
| JP | 2017-142143 A | 8/2017 |
| JP | 2019-124542 A | 7/2019 |
| WO | WO-03/067230 A1 | 8/2003 |
| WO | WO-2014/178294 A1 | 11/2014 |

OTHER PUBLICATIONS

Extended European Search Report issued on Feb. 6, 2025 in corresponding European patent application 22824496.8 (6 pages).
Kojima, Kazunobu et al., "Demonstration of omnidirectional photoluminescence (ODPL) spectroscopy for precise determination of internal quantum efficiency of radiation in GaN single crystals," Applied Physics Letters 111, Jul. 21, 2017.
Kojima, K. et al., "Internal quantum efficiency of radiation in a bulk $CH_3NH_3PbBr_3$ perovskite crystal quantified by using the omnidirectional photoluminescence spectroscopy," APL Materials, vol. 7, Jul. 31, 2019.

\* cited by examiner (a)

(b)

(a)

(b)

(c)

(a)

(b)

(c)

MEASUREMENT DEVICE

TECHNICAL FIELD

The present disclosure relates to a measurement device.

BACKGROUND ART

As a measurement method used for inspecting subjects to be measured such as semiconductor wafers, for example, photoluminescence measurement (hereinafter referred to as "PL measurement") is known. PL measurement is, for example, a method of measuring light emitted by recombination of electrons and holes generated by irradiating a semiconductor material with light having energy higher than a bandgap. In PL measurement, it is possible to detect the distribution of structural defects of crystals, but from the viewpoint of ensuring the quality of semiconductor wafers, improvements in quantification of defects and reproducibility are required.

As another measurement method, omnidirectional photoluminescence measurement (hereinafter referred to as "ODPL measurement") is known (see, for example, Non-Patent Literature 1). ODPL measurement is a method of measuring the number of photons of excitation light absorbed by a subject to be measured and the number of luminescence photons in all directions using an integrating sphere. ODPL measurement enables the quantification of defects because it enables the luminescence quantum efficiency of band edge luminescence that is affected by non-radiative recombination including impurity density, point defect density, and the like to be calculated.

CITATION LIST

Non-Patent Literature

[Non-Patent Literature 1] "Demonstration of omnidirectional photoluminescence (ODPL) spectroscopy for precise determination of internal quantum efficiency of radiation in GaN single crystals" Kazunobu Kojima et al., Applied Physics Letter 111, 032111 (2017)

SUMMARY OF INVENTION

Technical Problem

In a case where the subject to be measured is irradiated with the excitation light as in the above-mentioned PL measurement or ODPL measurement, from the viewpoint of ensuring the ease of adjustment of an irradiation spot of the excitation light, the irradiation spot of the excitation light on the subject to be measured in a field of view is preferably observable. For observation of the irradiation spot of the excitation light, for example, an image capturing unit constituted by a camera or the like can be used. However, in a case where the optical axis of the excitation light directed toward the subject to be measured is inclined with respect to an image capturing axis, it is difficult to directly observe the irradiation spot of the excitation light using the image capturing unit. Even in a case where a sensor of the image capturing unit does not have sufficient sensitivity to the wavelength of the excitation light or the wavelength of light generated at the subject to be measured due to the irradiation of the excitation light, it is difficult to directly observe the irradiation spot of the excitation light using the image capturing unit.

Further, in a case where the excitation light is light having relatively high energy such as ultraviolet light, it is conceivable that the irradiation with the excitation light causes deterioration of the subject to be measured. In this case, it is preferable to reduce the chances of irradiating the subject to be measured with the excitation light as much as possible, and there are also circumstances in which it is desirable to avoid irradiating the subject to be measured with the excitation light for observation of the irradiation spot of the excitation light in addition to the measurement.

The present disclosure has been made to solve the above problems, and an object of the present disclosure is to provide a measurement device capable of observing an irradiation spot of excitation light on a subject to be measured in a field of view without irradiating the subject to be measured with the excitation light.

Solution to Problem

According to an aspect of the present disclosure, there is provided a measurement device including: an excitation optical system configured to guide excitation light toward a subject to be measured; an illumination optical system configured to form an illumination spot of illumination light on the subject to be measured; and an image capturing unit configured to capture an image of the illumination spot on the subject to be measured, wherein the illumination optical system includes a light transmission member having a central region that has a first color and a peripheral region that has a second color different from the first color and surrounds the central region, and wherein the excitation optical system and the illumination optical system are optically connected to each other such that, in a field of view of the image capturing unit, an irradiation spot of the excitation light on the subject to be measured is included in a central spot region of the illumination light that has passed through the central region and is surrounded by a peripheral spot region of the illumination light that has passed through the peripheral region.

In the measurement device, the light transmission member included in the illumination optical system forms the peripheral spot region in the second color different from the first color around the central spot region in the subject to be measured irradiated with the illumination light. Therefore, by aligning the irradiation spot of the excitation light with the central spot region of the illumination light in advance, it is possible to observe the irradiation spot of the excitation light on the subject to be measured in the field of view without irradiating the subject to be measured with the excitation light. With this configuration, since the chances of irradiating the subject to be measured with the excitation light other than during measurement can be reduced, even in a case where the excitation light is light having relatively high energy such as ultraviolet light, it is possible to suppress the deterioration of the subject to be measured due to the irradiation with the excitation light. Further, since the peripheral spot region that surrounds the central spot region is formed in the second color different from the first color, observation of the entire image of the subject to be measured is also facilitated.

The light transmission member may be a colored pinhole with the central region open. In this case, even in a case where the size of the central region is reduced, the manufacturing of the light transmission member is facilitated.

In the light transmission member, the peripheral region may be annularly provided around the central region. In this case, the visibility of the irradiation spot of the excitation light on the subject to be measured is enhanced.

Shapes of the central region and the peripheral region may match a shape of an image capturing region in the image capturing unit. In this case, the shape of the central region is the same as the shape of the image captured by the image capturing unit, and thus it is easy to observe the entire image capturing region.

The light transmission member may further have a peripheral region that has a third color different from the second color and surrounds the peripheral region. In this case, it becomes easier to observe the entire image of the subject to be measured.

Advantageous Effects of Invention

According to the present disclosure, it is possible to observe an irradiation spot of excitation light on a subject to be measured in a field of view without irradiating the subject to be measured with the excitation light.

DESCRIPTION OF EMBODIMENTS

Hereinafter, a preferred embodiment of a measurement device according to an aspect of the present disclosure will be described in detail with reference to the drawings.

[Outline of Measurement Device]

Figure 1:
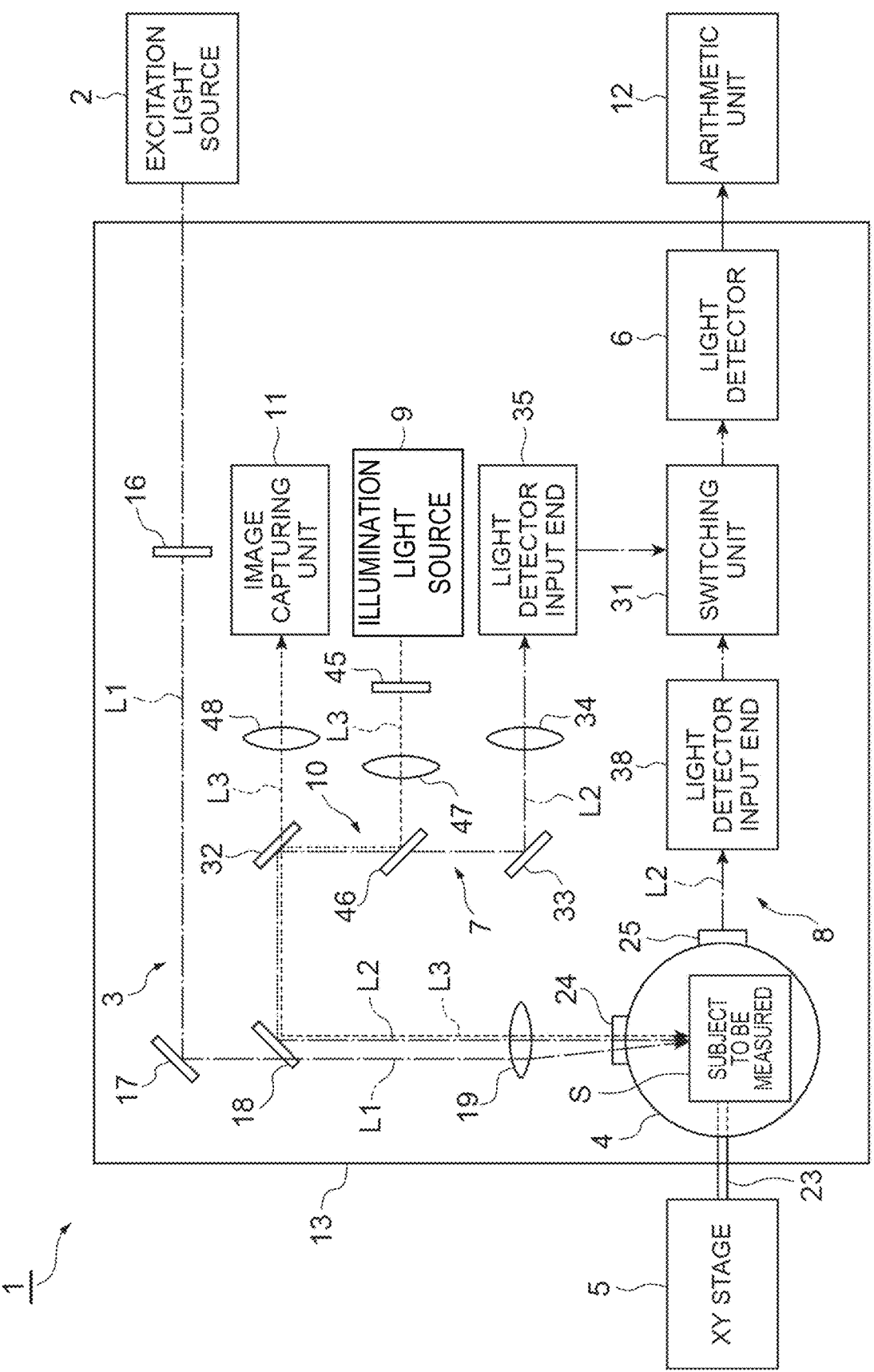
FIG. 1 is a schematic view showing a configuration of a measurement device according to an embodiment of the present disclosure.

FIG. 1 is a schematic view showing a configuration of a measurement device according to an embodiment of the present disclosure. A measurement device 1 shown in FIG. 1 is configured as a device for performing a non-destructive inspection of a subject to be measured S, for example. In the present embodiment, compound semiconductor crystals are exemplified as the subject to be measured S. More specifically, the subject to be measured S is gallium nitride (GaN) semiconductor crystals. The GaN semiconductor is a material expected to be applied to visible/ultraviolet light emitting devices, high frequency devices, and power devices. It is known that the characteristics of devices using the GaN semiconductor are greatly affected by structural defects such as threading dislocations, point defects, and contamination with trace impurities. The measurement device 1 is configured as a device for inspecting both the distribution of structural defects and the quantification of defects in GaN semiconductor crystals in order to improve the yield of devices and promote mass production.

In the measurement device 1, in inspecting both the distribution of structural defects and the quantification of defects in the GaN semiconductor crystals, omnidirectional photoluminescence measurement (hereinafter referred to as "ODPL measurement") is executed on the subject to be measured. In ODPL measurement, as a preliminary step, the measurement of the external quantum efficiency (EQE) of the subject to be measured S is executed using an integrating sphere. Further, as a later step, the calculation of the internal quantum efficiency (IQE) of the subject to be measured S is executed using a standard photoluminescence spectrum (hereinafter referred to as a "standard PL spectrum") of the subject to be measured.

Figure 2:
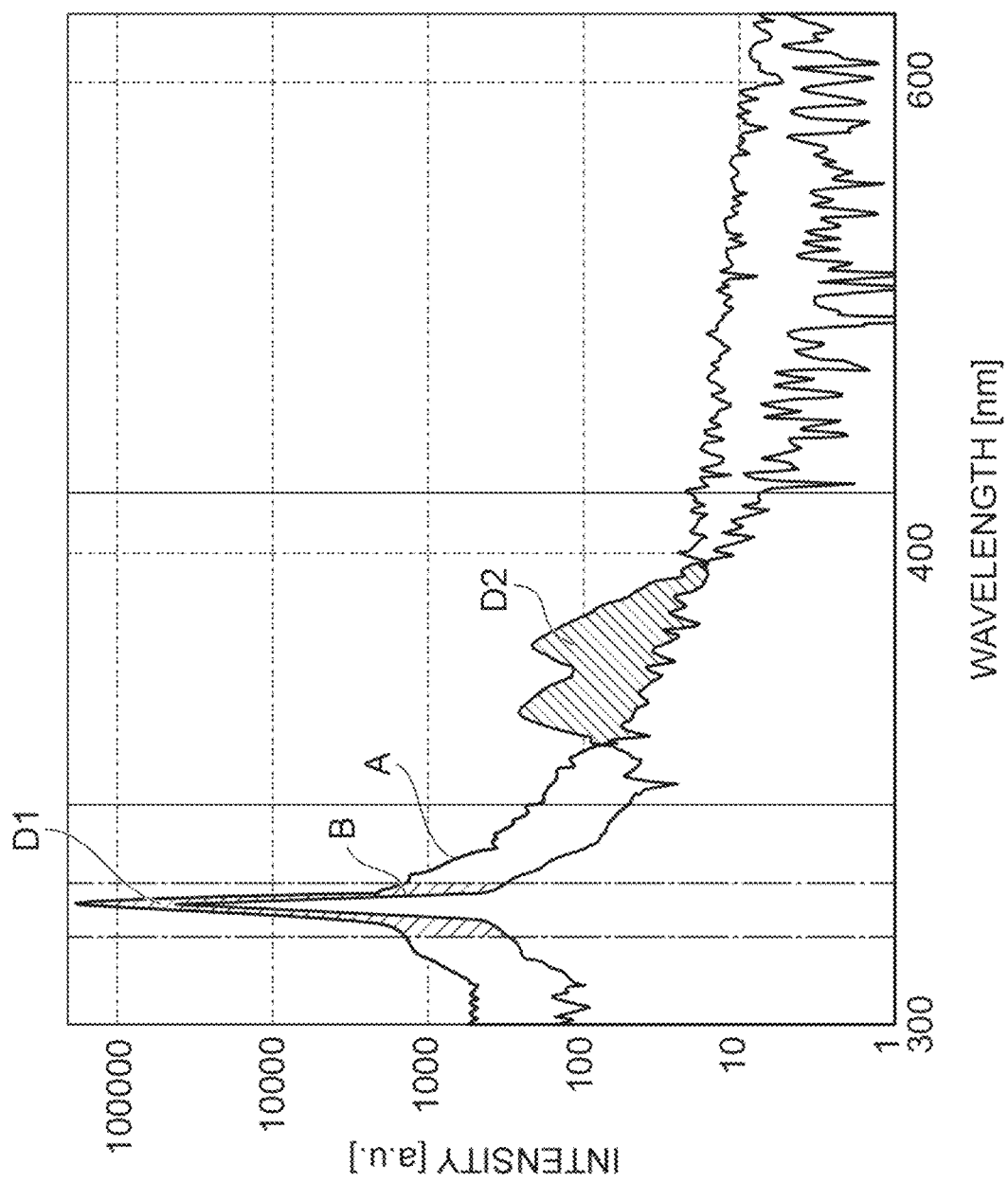
FIG. 2 is a diagram showing a method of calculating external quantum efficiency.

The external quantum efficiency is a ratio of the number of luminescence photons emitted to the outside of the subject to be measured to the number of photons of the excitation light absorbed by the subject to be measured. A graph shown in FIG. 2 shows a spectrum of light to be measured output from the integrating sphere in a case where the excitation light is input to the integrating sphere with no sample disposed in the integrating sphere (a graph A in FIG. 2), and a spectrum of the light to be measured output from the integrating sphere in a case where the excitation light is input to the integrating sphere with a sample disposed in the integrating sphere (a graph B in FIG. 2). The number of photons of the excitation light absorbed by the subject to be measured corresponds to a difference between the spectrum of the graph A and the spectrum of the graph B (a region D1 in FIG. 2) in a wavelength region of the excitation light. The number of luminescence photons emitted to the outside of the subject to be measured corresponds to a difference between the spectrum of the graph A and the spectrum of the graph B (a region D2 in FIG. 2) in a luminescence wavelength region of the light to be measured.

The internal quantum efficiency is a ratio of the number of luminescence photons generated at the subject to be measured to the number of photons of the excitation light absorbed by the subject to be measured. The external quantum efficiency is obtained by considering the effect of the light extraction efficiency from the subject to be measured on the internal quantum efficiency. The light extraction efficiency from the subject to be measured is a known value determined for a material of the subject to be measured. For example, the light extraction efficiency of the GaN crystals is estimated to be 2.55% (see "Determination of absolute value of quantum efficiency of radiation in high quality GaN single crystals using an integrating sphere" Kazunobu Kojima et al., Journal of Applied Physics 120, 015704 (2016)).

Therefore, if the standard PL spectrum and the external quantum efficiency of the subject to be measured are obtained, the internal quantum efficiency of the subject to be measured can be derived. For example, in the GaN crystals, there is a tendency of higher internal quantum efficiency when the crystallinity is higher and the number of defects of a material is smaller (see Non-Patent Literature 1 described above, for example). In other words, the internal quantum efficiency directly reflects the crystalline quality of a material, and by evaluating the crystalline quality of a wafer material during wafer manufacturing, it is possible to evaluate the factors that affect device life and performance.

Figure 3:
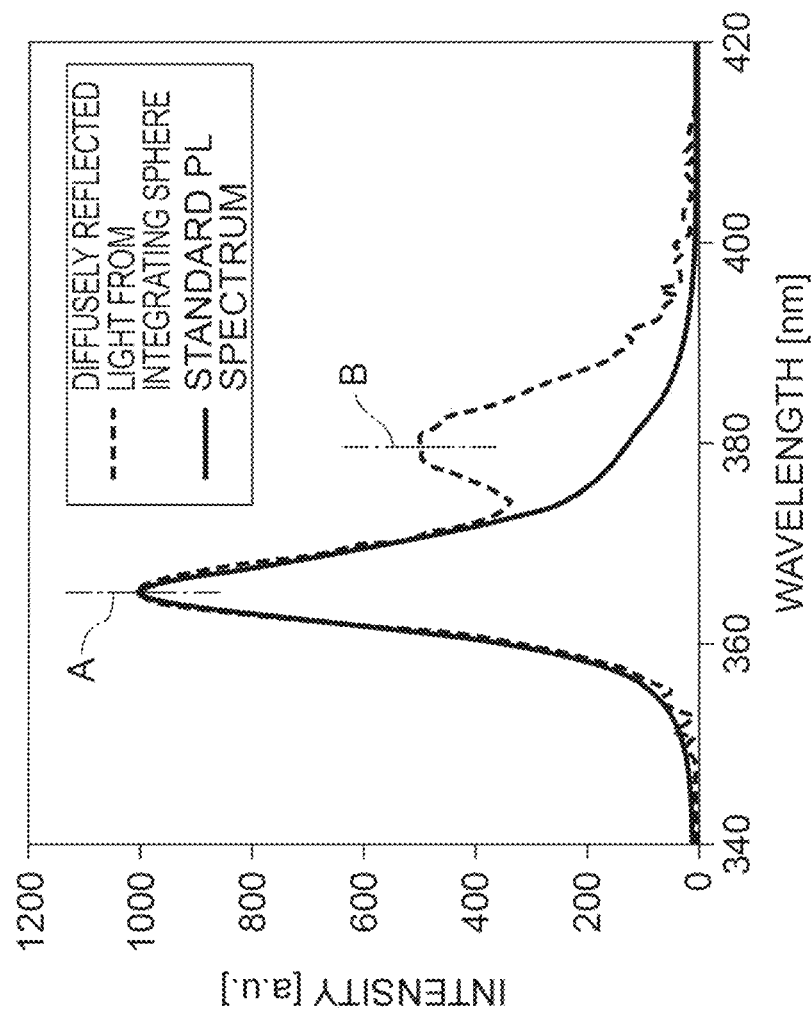
FIG. 3 is a diagram showing an example of a standard PL spectrum.

Calculation of the internal quantum efficiency requires measurement of a standard PL spectrum of the subject to be measured. Measurement using an integrating sphere involves detecting light incident on the integrating sphere and omnidirectional light generated from a subject to be measured. In a case where it is tried to execute the measurement of the standard PL spectrum using the integrating sphere, for example, as shown in FIG. 3, in order to detect omnidirectional photoluminescence, a spectral peak (a peak B in FIG. 3) is generated in addition to the original peak of the standard PL spectrum (a peak A in FIG. 3). For this reason, when the measurement of the standard PL spectrum of the subject to be measured is executed, the integrating sphere is generally not used. On the other hand, in the measurement device 1, from the viewpoint of convenience of measurement, a configuration is devised such that executing the measurement of the standard PL spectrum of the subject to be measured is possible in a state where the subject to be measured is disposed in the integrating sphere. A configuration of this measurement device 1 will be described in detail below.

[Configuration of Measurement Device]

As shown in FIG. 1, the measurement device 1 includes an excitation light source 2, an excitation optical system 3, an integrating sphere 4, an XY stage 5, a light detector 6, a first detection optical system 7, a second detection optical system 8, an illumination light source 9, an illumination optical system 10, an image capturing unit 11, and an arithmetic unit 12. In the present embodiment, the excitation optical system 3, the integrating sphere 4, the light detector 6, the first detection optical system 7, the second detection optical system 8, the illumination light source 9, the illumination optical system 10, and the image capturing unit 11 are accommodated in a housing 13 made of a member such as a metal. The excitation light source 2, the XY stage 5, and the arithmetic unit 12 are externally attached to the housing 13.

The excitation light source 2 is a device that outputs excitation light L1 to the subject to be measured S. The excitation light source 2 may be either a coherent light source or an incoherent light source. As the coherent light source, for example, an excimer laser (wavelength: 193 nm), a YAG laser second harmonic wave (wavelength: 532 nm), a YAG laser fourth harmonic wave (wavelength: 266 nm), a HeCd laser (wavelength: 325 nm), a semiconductor excitation all-solid-state UV laser (wavelength: 320 nm), a semiconductor laser (for example, an InGaN semiconductor laser (wavelength: 375 nm to 530 nm), a red semiconductor laser, an infrared semiconductor laser), or the like can be used. As the incoherent light source, for example, a mercury lamp (wavelength: 365 nm), an LED light source, an SLD light source, or the like can be used. The excitation light L1 output from the excitation light source 2 may be either pulsed light or CW light. In a case where the subject to be measured S is the GaN semiconductor crystals, as the excitation light source 2, for example, the YAG laser fourth harmonic wave, the HeCd laser, or the semiconductor excitation all-solid-state UV laser of the above light sources is used.

The excitation optical system 3 is an optical system that guides the excitation light L1 toward the subject to be measured S. The excitation optical system 3 includes a variable attenuation filter 16, a mirror 17, a separation optical element 18, and a lens 19, for example. The variable attenuation filter 16 is an element for changing the intensity of the excitation light L1 with which the subject to be measured S is irradiated and adjusts the intensity of the excitation light L1 directed toward the subject to be measured S.

Figure 4:
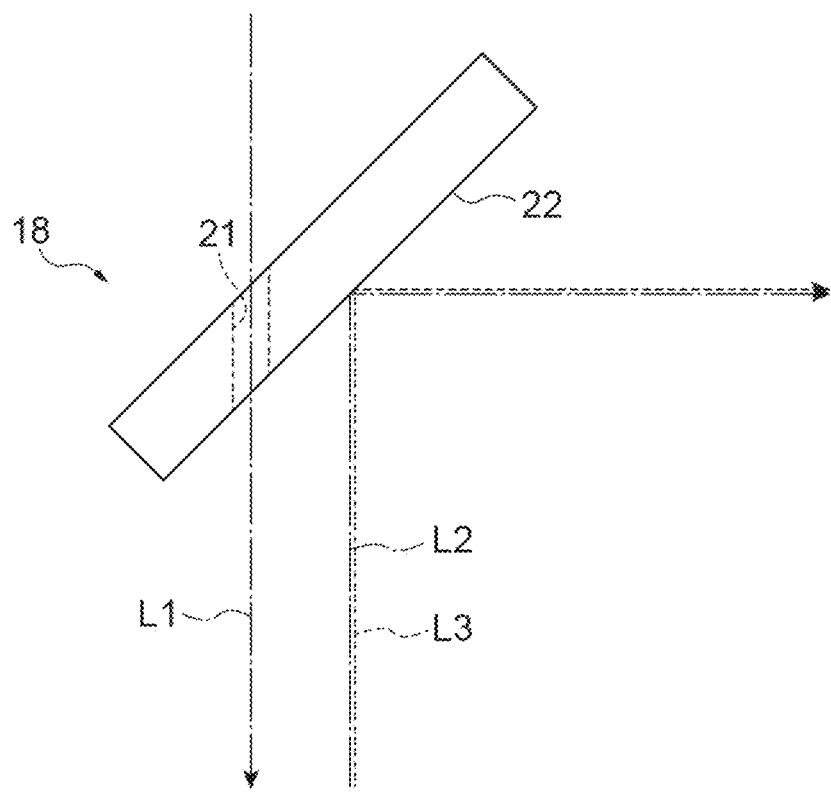
FIG. 4 is a schematic view showing an example of a configuration of a separation optical element.

The separation optical element 18 is an element that separates an optical axis of the excitation light L1 directed toward the subject to be measured S in the integrating sphere 4 and an optical axis of the light to be measured L2 generated at the subject to be measured S through the irradiation with the excitation light L1 from each other. In the present embodiment, as shown in FIG. 4, the separation optical element 18 is constituted by a so-called perforated mirror and has an opening portion 21 through which the excitation light L1 passes and a reflecting surface 22 for reflecting the light to be measured L2 and illumination light L3, which will be described below. On the reflecting surface 22, the light to be measured L2 is reflected at a position shifted from the opening portion 21. As a result, the optical axis of the excitation light L1 directed toward the subject to be measured S in the integrating sphere 4 and the optical axis of the light to be measured L2 output from the integrating sphere 4 and directed toward the light detector 6 are separated from each other.

The lens 19 is constituted by, for example, a convex lens. The lens 19 converges the excitation light L1 and the illumination light L3 directed toward the integrating sphere 4 onto the surface of the subject to be measured S. That is, the lens 19 forms an irradiation spot La of the excitation light L1 and an illumination spot Lb of the illumination light L3 on the subject to be measured S in the integrating sphere 4 (see FIG. 8(a)). Further, the lens 19 collimates the light to be measured L2 and the illumination light L3 from the integrating sphere 4.

The integrating sphere 4 is a device that spatially integrates light by diffusely reflecting the light on the sphere inner wall to which a reflective coating is applied. The shape of the integrating sphere 4 is not limited to spherical and may be hemispherical. The subject to be measured S is disposed inside the integrating sphere 4. In the present embodiment, the tip end portion of an arm 23 connected to the XY stage 5 extends inside the integrating sphere 4, and the tip end portion of the arm 23 holds the subject to be measured S. As a result, the subject to be measured S can be scanned inside the integrating sphere 4 in an XY plane direction.

The integrating sphere 4 has a first port 24 and a second port 25. The first port 24 opens in a direction orthogonal to the scanning plane (the XY plane) of the subject to be measured S scanned by the XY stage 5. The second port 25 opens in a direction (an X direction or a Y direction) orthogonal to the opening direction of the first port 24. In the present embodiment, the first port 24 is a port for standard PL spectrum measurement, and the second port 25 is a port for external quantum efficiency measurement. In the standard PL spectrum measurement, the excitation light L1 directed toward the subject to be measured S by the excitation optical system 3 and the light to be measured L2 generated at the subject to be measured S in the integrating sphere 4 both pass through the first port 24 of the integrating sphere 4. In the external quantum efficiency measurement, the excitation light L1 directed toward the subject to be measured S by the excitation optical system 3 passes through the first port 24, and the light to be measured L2 diffusely reflected in the integrating sphere 4 passes through the second port 25.

The light detector 6 is a device that detects the light to be measured L2 generated at the subject to be measured in the integrating sphere 4 through the irradiation with the excitation light L1. The light detector 6 is optically connected to one of the first detection optical system 7 and the second detection optical system 8 via a switching unit 31. As the light detector 6, for example, a CMOS, a CCD, an EM-CCD, a photomultiplier tube, an SiPM (a MPPC), an APD (an SPAD), a photodiode (including an array type), or the like can be used. In the present embodiment, the light detector 6 is constituted by a BT-CCD (a multi-channel light detector incorporating a back surface incidence type CCD) therein. The light detector 6 outputs a signal based on the detection result to the arithmetic unit 12. The light detector 6 may incorporate an element (for example, a variable attenuation filter) for suppressing saturation of the light to be measured L2.

The first detection optical system 7 is an optical system that guides the light to be measured L2 from the integrating sphere 4 toward the light detector 6 in the standard PL spectrum measurement. The first detection optical system 7 includes a dichroic mirror 32, a mirror 33, and a lens 34 in addition to the lens 19 and the separation optical element 18 which are common to the excitation optical system 3. The light to be measured L2 output from the first port 24 of the integrating sphere 4 is guided by the first detection optical system 7 and input to the light detector 6 via a light detector input end 35.

Figure 5:
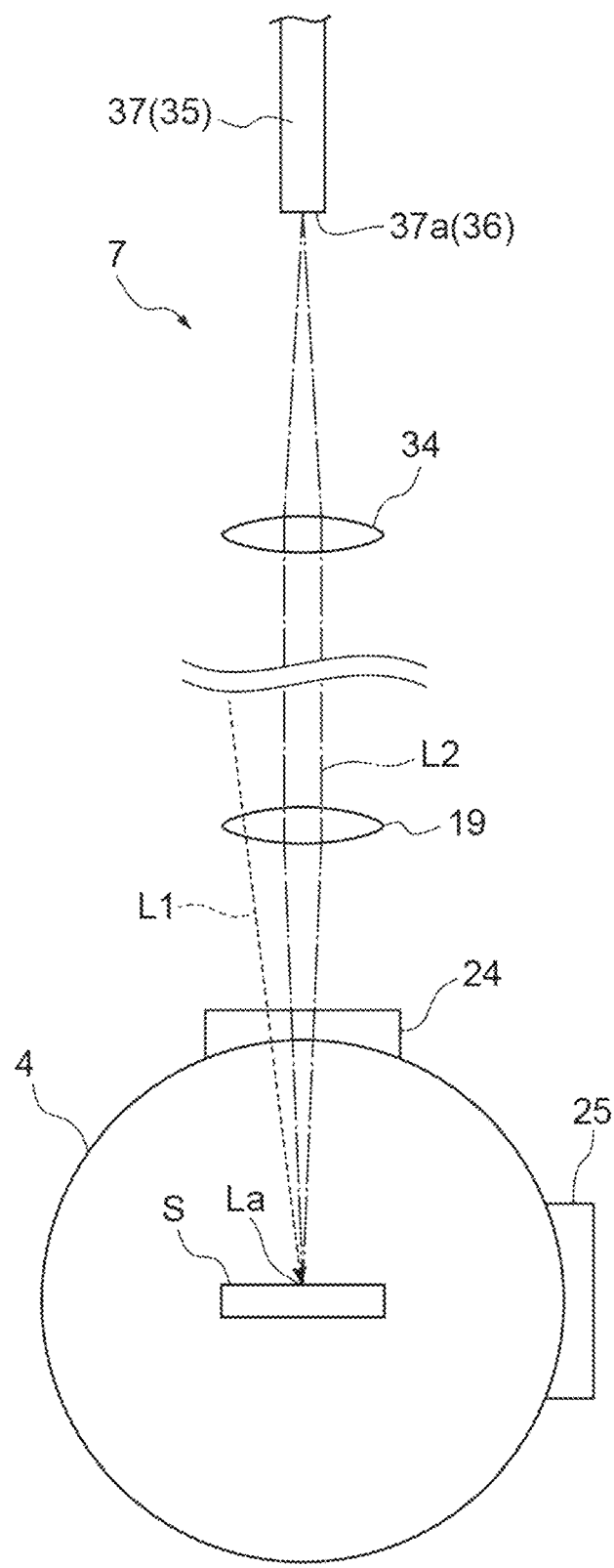
FIG. 5 is a schematic view showing an optical connection state between an excitation optical system and a first detection optical system in standard PL spectrum measurement.

FIG. 5 is a schematic view showing an optical connection state between the excitation optical system and the first detection optical system in the standard PL spectrum measurement. As shown in FIG. 5, in the standard PL spectrum measurement, in executing the measurement of the standard PL spectrum in a state where the subject to be measured S is disposed in the integrating sphere 4, the optical axis of the excitation light L1 directed toward the subject to be measured S and the optical axis of the light to be measured L2 generated at the subject to be measured S through the irradiation with the excitation light L1 are separated from each other by the separation optical element 18 described above. For this reason, the optical axis of the excitation light L1 incident on the subject to be measured S in the integrating sphere 4 via the lens in the excitation optical system 3 and the optical axis of the light to be measured L2 that is emitted from the integrating sphere 4 in the first detection optical system 7 obliquely intersect with each other at a certain angle.

In the example of FIG. 5, the optical axis of the excitation light L1 incident on the integrating sphere 4 is inclined with respect to the surface of the subject to be measured S (the XY plane), and the optical axis of the light to be measured L2 that is emitted from the integrating sphere 4 is perpendicular to the surface of the subject to be measured S (the XY plane). In this way, the optical axis of the excitation light L1 and the optical axis of the light to be measured L2 obliquely intersect with each other, and thus the excitation light L1 reflected by the subject to be measured S in the integrating sphere 4 can be prevented from being directly detected by the light detector 6.

The first detection optical system 7 is provided with an opening portion 36 that limits a detection range of the light to be measured L2 in the light detector 6. In the present embodiment, the light detector 6 is a fiber input type detector. Further, the light detector input end 35 is constituted by a bundle fiber 37 in which the strands of optical fibers are bundled. Therefore, in the present embodiment, an end surface 37a of the bundle fiber 37 corresponds to the opening portion 36 that limits the detection range of the light to be measured L2 in the light detector 6.

As shown in FIG. 5, the excitation light L1 directed toward the subject to be measured S is converged by the lens 19 and forms an image on the surface of the subject to be measured S. The light to be measured L2 generated at the subject to be measured S through the irradiation with the excitation light L1 is collimated by the lens 19, then is converged by the lens 34, and forms an image on the end surface 37a (the opening portion 36) of the bundle fiber 37. That is, the irradiation spot La of the excitation light L1 on the subject to be measured S and the opening portion 36 are in an optically conjugate relationship. Since the irradiation spot La and the opening portion 36 are in an optically conjugate relationship, the influence of multiple scattering within the integrating sphere 4 can be suppressed, and only the light to be measured L2 generated on the surface of the subject to be measured S through the incidence of the excitation light L1 can be extracted from the integrating sphere 4 to be detected. Therefore, in the measurement device 1, it is possible to execute the measurement of the standard PL spectrum of the subject to be measured S in a state where the subject to be measured S is disposed in the integrating sphere 4.

The second detection optical system 8 is an optical system that guides the light to be measured L2 diffusely reflected in the integrating sphere 4 from the integrating sphere 4 toward the light detector 6 in the external quantum efficiency measurement. In the second detection optical system 8, the light to be measured L2 output from the second port 25 of the integrating sphere 4 is input to the light detector 6 via a light detector input end 38 that is separate from the first detection optical system 7. The light detector input end 38 is constituted by, for example, a bundle fiber 39 (see FIG. 6) in which the strands of optical fibers are bundled, similarly to the light detector input end 35 of the first detection optical system 7.

Figure 6:
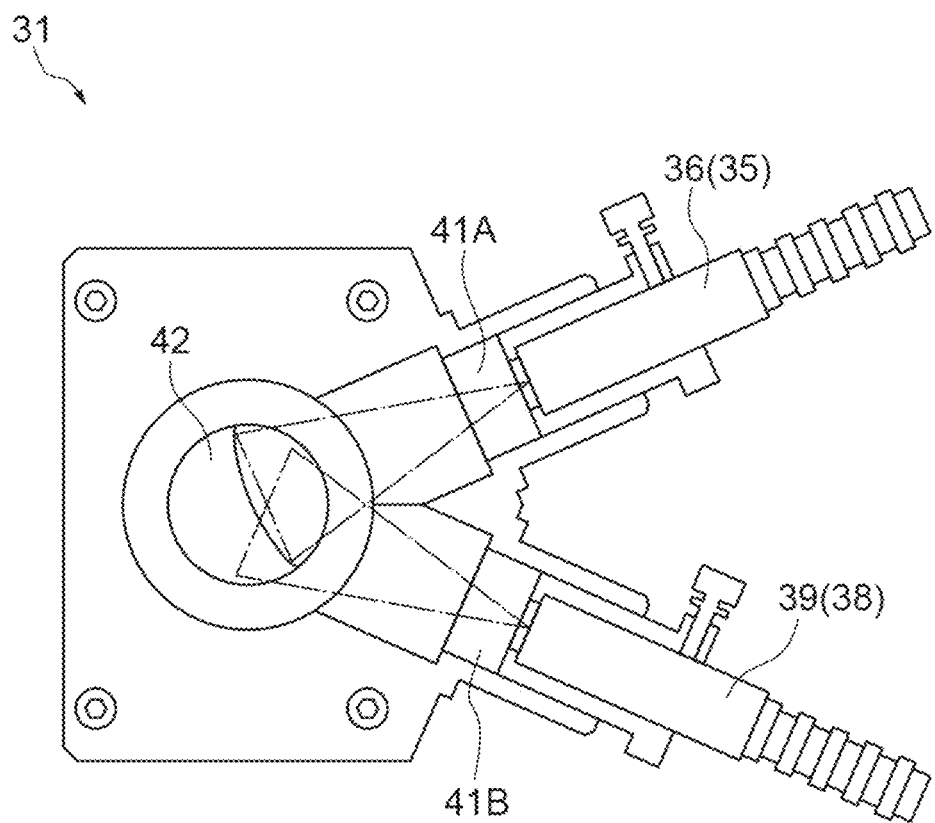
FIG. 6 is a schematic view showing an example of a configuration of a switching unit.

The switching unit 31 is a portion that optically connects one of the first detection optical system 7 and the second detection optical system 8 to the light detector 6. The switching unit 31 includes, for example, a pair of light guides 41A and 41B and an off-axis parabolic mirror 42, as shown in FIG. 6. The light detector input end 35 (the bundle fiber 37) on a side of the first detection optical system 7 is optically connected to the light guide 41A. The light detector input end 38 (the bundle fiber 39) on a side of the second detection optical system 8 is optically connected to the light guide 41B. The direction of the reflecting surface of the off-axis parabolic mirror 42 is variable by a driving means such as a stepping motor. Since the off-axis parabolic mirror 42 is optically coupled to one of the light guides 41A and 41B, only one of the excitation light L1 from the light guide 41A and the excitation light L1 from the light guide 41B is guided toward the light detector 6.

As shown in FIG. 1, the measurement device 1 includes the illumination light source 9, the image capturing unit 11, and the illumination optical system 10 as a configuration for observing the irradiation spot of the excitation light L1 on the subject to be measured S. The illumination light source 9 is a device that outputs the illumination light L3 to the subject to be measured S. As the illumination light source 9, for example, an LED capable of outputting white light can be used. The image capturing unit 11 is a portion that captures an image of the illumination spot Lb (see FIGS. 8(a) and 8(b)) of the illumination light L3 on the subject to be measured S. As the image capturing unit 11, for example, a device having sensitivity in a visible range can be used. Examples of such a device include a color CMOS, a color CCD camera, and the like.

The illumination optical system 10 includes a light transmission member 45, a dichroic mirror 46, and lenses 47 and 48 in addition to the lens 19, the separation optical element 18, and the dichroic mirror 32 which are common to the first detection optical system 7. The light transmission member 45 is a member for coloring the illumination light L3 for identification of the irradiation spot of the excitation light L1. The light transmission member 45 is formed of a member having light transmittance such as acrylic or glass in a disc shape.

Figure 7:
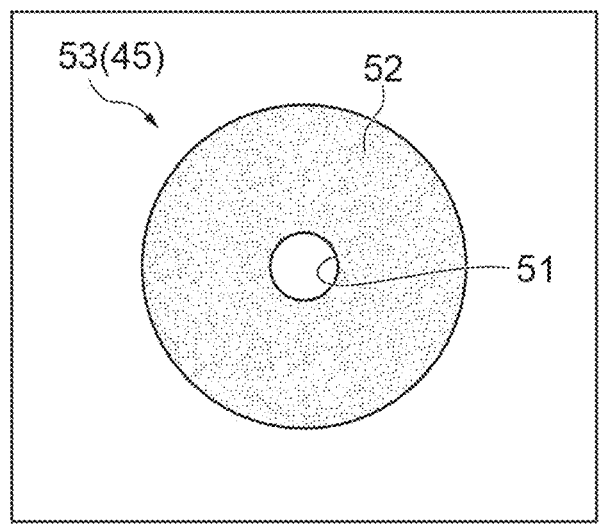
FIG. 7 is a schematic view showing a main part of an illumination optical system.

As shown in FIG. 7, the light transmission member 45 has a circular central region 51 that has a first color and an annular peripheral region 52 that has a second color different from the first color and surrounds the central region 51. Here, the light transmission member 45 is constituted by a colored pinhole 53 with the central region 51 open, and the first color is colorless. The second color of the peripheral region 52 can be any color, for example green. In the illumination light L3 that has passed through the light transmission member 45, the color of a portion that has passed through the central region 51 remains white, and the color of a portion that has passed through the peripheral region 52 changes from white to green.

Figure 8:
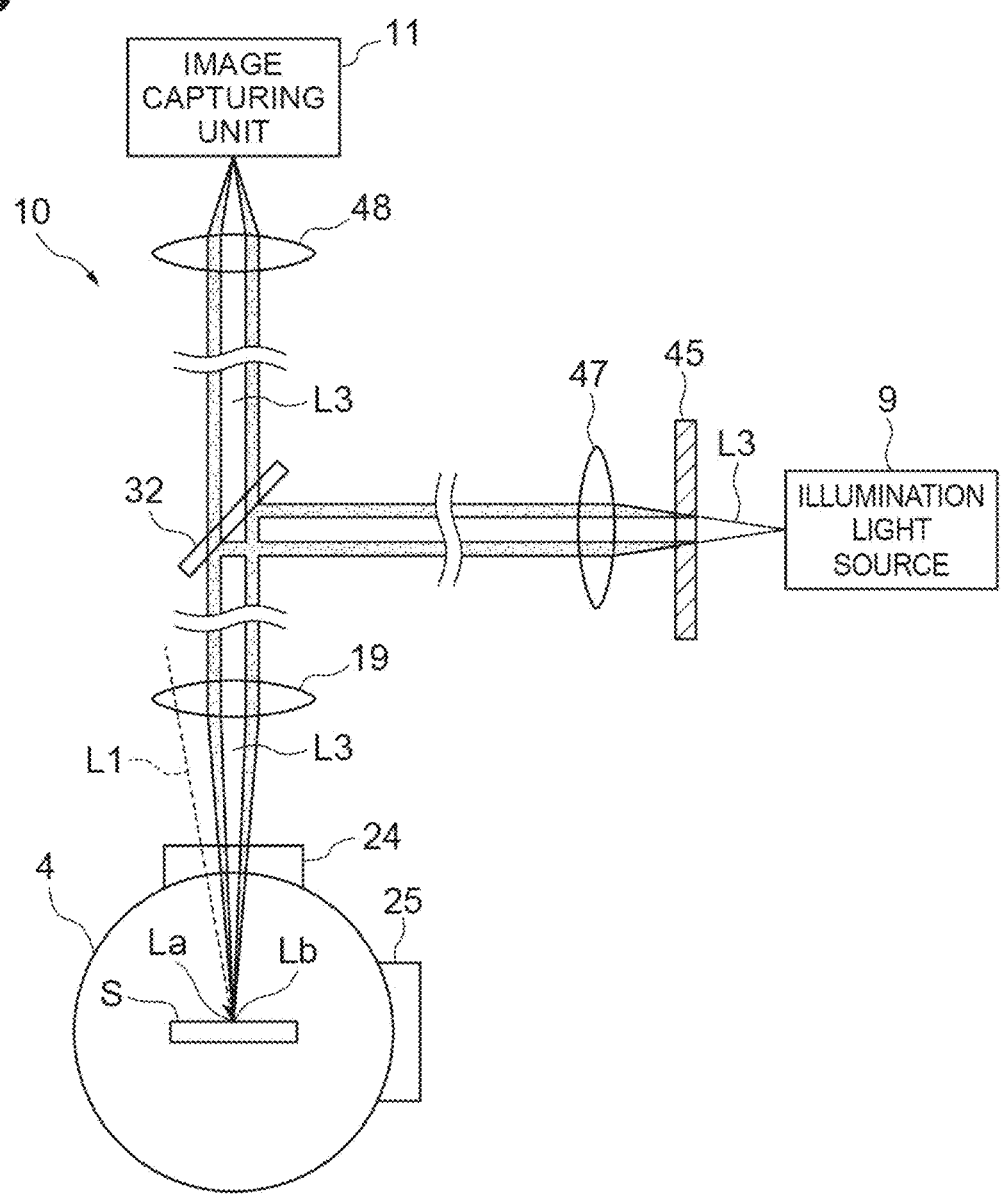
FIG. 8(a) is a schematic view showing an optical connection state between the excitation optical system and the illumination optical system.
FIG. 8(b) is a schematic diagram showing a positional relationship between an irradiation spot and an illumination spot of excitation light on a subject to be measured in a field of view of an image capturing unit.
Figure 8:
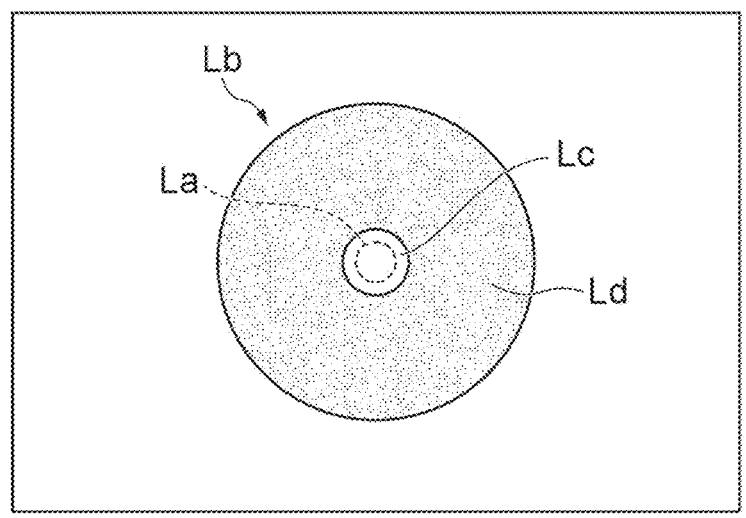

FIG. 8(a) is a schematic view showing an optical connection state between the excitation optical system and the illumination optical system. As shown in FIG. 8(a), the illumination light L3 that has passed through the light transmission member 45 is guided to the subject to be measured S in the integrating sphere 4 by the dichroic mirror 32 and the like. The illumination light L3 is collimated by the lens 47, then is converged by the lens 19, and forms an image on the surface of the subject to be measured S. AS a result, the illumination spot Lb of the illumination light L3 is formed on the surface of the subject to be measured S.

In the example of FIGS. 8(a) and 8(b), the optical axis of the illumination light L3 directed toward the subject to be measured S in the integrating sphere 4 matches the optical axis of the light to be measured L2 output from the integrating sphere 4. For this reason, the optical axis of the excitation light L1 directed toward the subject to be measured S obliquely intersect with the optical axis of the illumination light L3 directed toward the subject to be measured S. Here, the optical axis of the excitation light L1 incident on the subject to be measured S is inclined with respect to the surface of the subject to be measured S (the XY plane) as described above, and the optical axis of the illumination light L3 is perpendicular to the surface of the subject to be measured S (the XY plane). The illumination light L3 reflected by the surface of the subject to be measured S is guided to the image capturing unit 11 by the dichroic mirror 32 and the like. The illumination light L3 is collimated by the lens 19, then is converged by the lens 48, and forms an image on an image capturing surface of the image capturing unit 11.

As shown in FIG. 8(b), the excitation optical system 3 and the illumination optical system 10 are optically connected to each other such that in a field of view of the image capturing unit 11, the irradiation spot La of the excitation light L1 on the subject to be measured S is included in a central spot region Lc of the illumination light L3 that has passed through the central region 51 and is surrounded by a peripheral spot region Ld of the illumination light L3 that has passed through the peripheral region 52. In the example of FIG. 8(b), the irradiation spot La of the excitation light L1 is positioned substantially at the center of the white circular central spot region Lc, and the green annular peripheral spot region Ld is positioned around the white circular central spot region Lc.

By placing a target jig equivalent to the subject to be measured S in the integrating sphere 4 and aligning the irradiation spot La of the excitation light L1 with the central spot region Lc of the illumination light L3 in advance, it is possible to observe the irradiation spot La of the excitation light L1 on the subject to be measured S in the field of view without irradiating the subject to be measured S with the excitation light L1 when the actual standard PL spectrum measurement and external quantum efficiency measurement are performed. In addition, since the peripheral spot region Ld that surrounds the central spot region Lc has the second color, it is possible to observe the structure of the subject to be measured S around the irradiation spot La of the excitation light L1 using the image capturing unit 11.

In a case where the positional alignment between the irradiation spot La of the excitation light L1 and the central spot region Lc of the illumination light L3 is performed, a target jig equivalent to the subject to be measured S is disposed in the integrating sphere 4, for example. A mark such as a circle is attached to the center of the target jig. In this state, by adjusting the angles of the separation optical element 18 and the dichroic mirror 46 and aligning the position of the irradiation spot La and the position of the central spot region Lc of the illumination light L3 with the mark on the target jig, it is possible to execute the positional alignment between the irradiation spot La of the excitation light L1 and the central spot region Lc of the illumination light L3.

The arithmetic unit 12 is a portion that calculates the external quantum efficiency and the internal quantum efficiency of the subject to be measured S on the basis of the signal output from the light detector 6. Physically, the arithmetic unit 12 is a computer system that includes a memory such as RAM and ROM, a processor (an arithmetic circuit) such as a CPU, a communication interface, a storage unit such as a hard disk, and a display unit such as a display. Examples of the computer system include a personal computer, a cloud server, a smart device (a smartphone, a tablet terminal, or the like), and the like. The arithmetic unit 12 may be constituted by a programmable logic controller (PLC), or may be constituted by an integrated circuit such as a field-programmable gate array (FPGA).

In the standard PL spectrum measurement, the arithmetic unit 12 generates measurement data of the standard PL spectrum on the basis of the signal output from the light detector 6 and stores the measurement data of the standard PL spectrum in the storage unit. In the external quantum efficiency measurement, the arithmetic unit 12 calculates the external quantum efficiency of the subject to be measured S on the basis of the signal (the measurement signal and the reference signal) output from the light detector 6 and stores the calculation data of the external quantum efficiency in the storage unit. Further, the arithmetic unit 12 calculates the internal quantum efficiency of the subject to be measured S on the basis of the measurement data of the standard PL spectrum and the calculation data of the external quantum efficiency and stores the calculation data of the internal quantum efficiency in the storage unit. The arithmetic unit 12 may output the measurement data of the standard PL spectrum, the calculation data of the external quantum efficiency, and the calculation data of the internal quantum efficiency which are obtained to a monitor or the like.

[Procedure for Executing ODPL Measurement Using Measurement Device]

Figure 9:
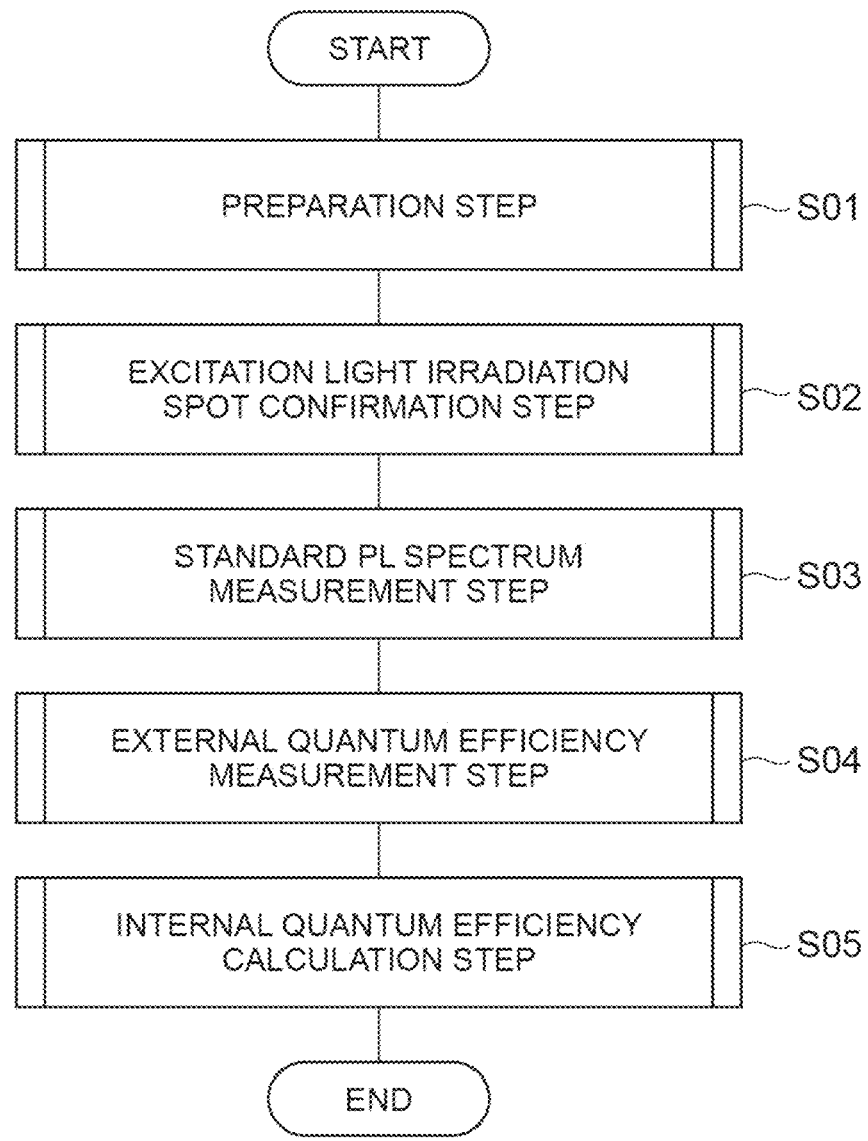
FIG. 9 is a flowchart of ODPL measurement using the measurement device shown in FIG. 1.

FIG. 9 is a flowchart of ODPL measurement using the measurement device. As shown in FIG. 9, in ODPL measurement using the measurement device 1, a preparation step (step S01), an excitation light irradiation spot confirmation step (step S02), a standard PL spectrum measurement step (step S03), an external quantum efficiency measurement step (step S04), and an internal quantum efficiency calculation step (step S05) are executed in that order.

Figure 10:
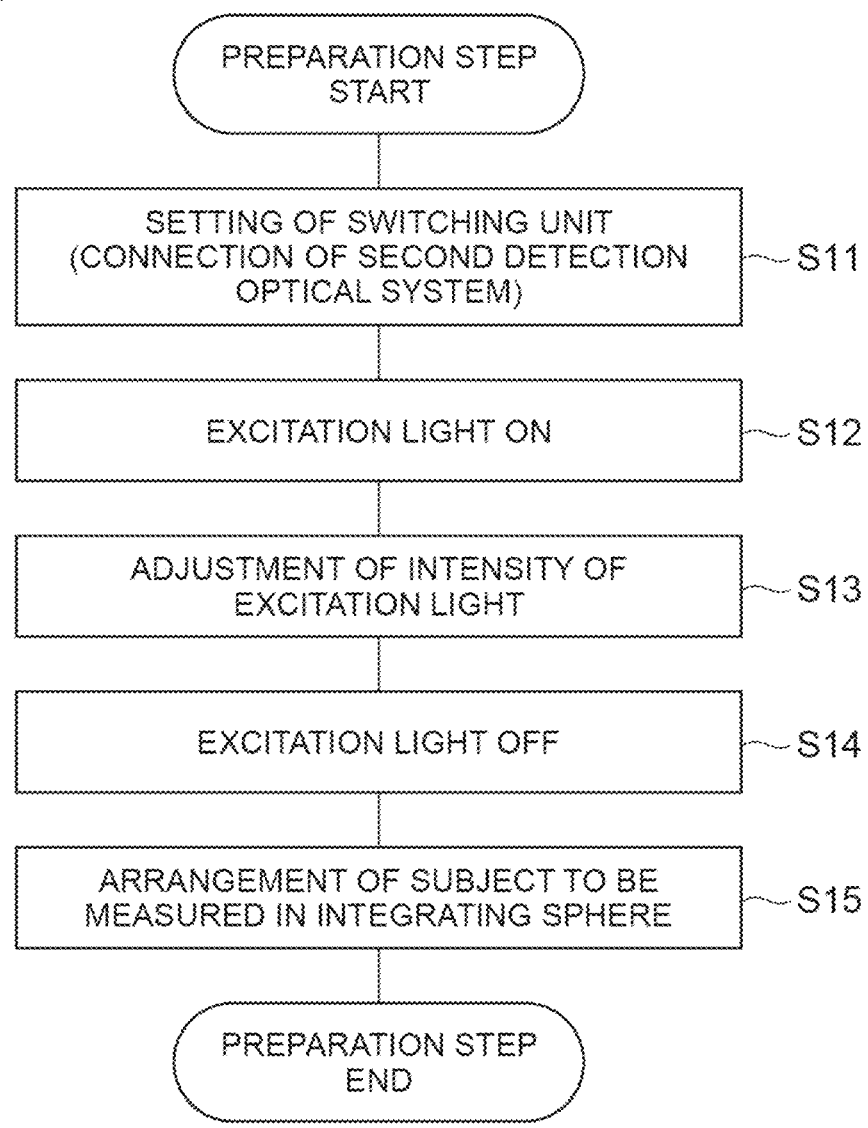
FIG. 10 is a flowchart of a preparation step.

In the preparation step S01, as shown in FIG. 10, first, setting of the switching unit 31 is performed (step S11). Here, the off-axis parabolic mirror 42 of the switching unit 31 is driven to optically connect the second detection optical system 8 to the light detector 6. Next, the excitation light L1 is output from the excitation light source 2 (step S12), and adjustment of the intensity of the excitation light L1 is performed (step S13). The adjustment of the intensity of the excitation light L1 is executed by adjusting the variable attenuation filter 16 or the variable attenuation filter incorporated in the light detector 6 such that the light output from the integrating sphere 4 through the incidence of the excitation light L1 does not saturate in the light detector 6. After the adjustment of the intensity of the excitation light L1, the output of the excitation light L1 is stopped (step S14). Then, the subject to be measured S is held after the arm 23 of the XY stage 5 is removed from the integrating sphere 4, and the subject to be measured S is disposed in the integrating sphere 4 while being held by the arm 23 (step S15).

Figure 11:
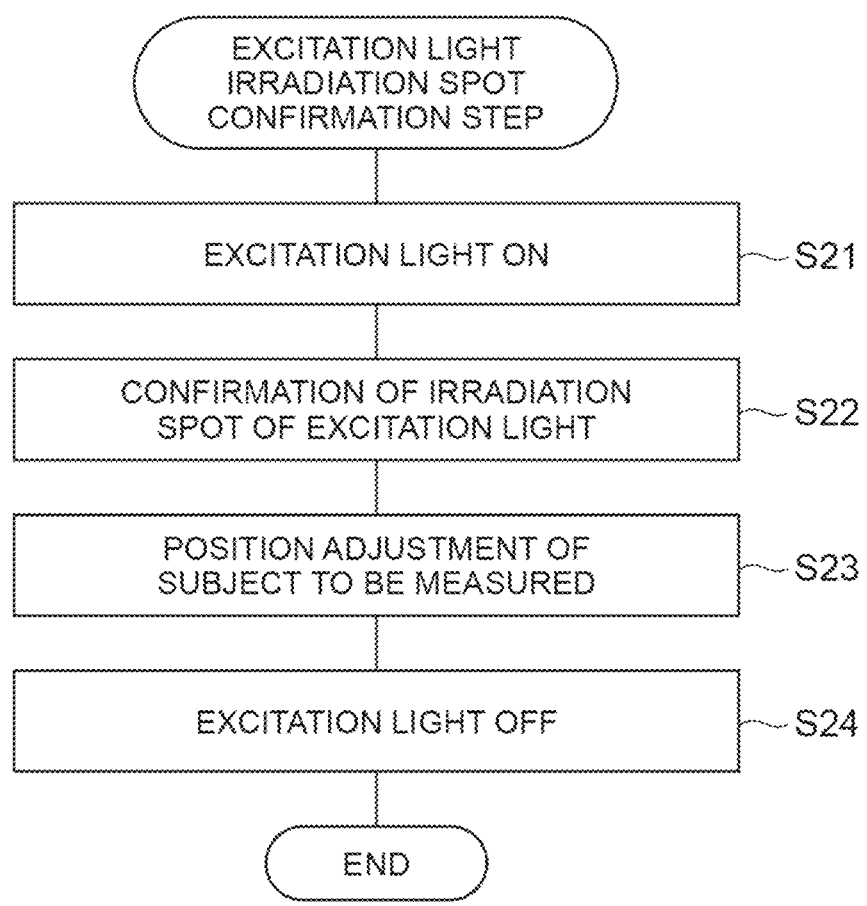
FIG. 11 is a flowchart of an excitation light irradiation spot confirmation step.

In the excitation light irradiation spot confirmation step S02, as shown in FIG. 11, first, the illumination light L3 is output from the illumination light source 9 (step S21). Next, an image of the illumination spot Lb of the illumination light L3 formed on the subject to be measured S in the integrating sphere 4 through the irradiation with the illumination light L3 is captured by the image capturing unit 11 (step S22). By observing the central region 51 and the peripheral region 52 in the irradiation spot La on the subject to be measured S in the field of view, it is possible to confirm the irradiation spot La of the excitation light L1 on the subject to be measured S. After the irradiation spot La of the excitation light L1 is confirmed, the position adjustment of the subject to be measured S is performed by the XY stage 5 as necessary (step S23), and the output of the irradiation light is stopped (step S24).

Figure 12:
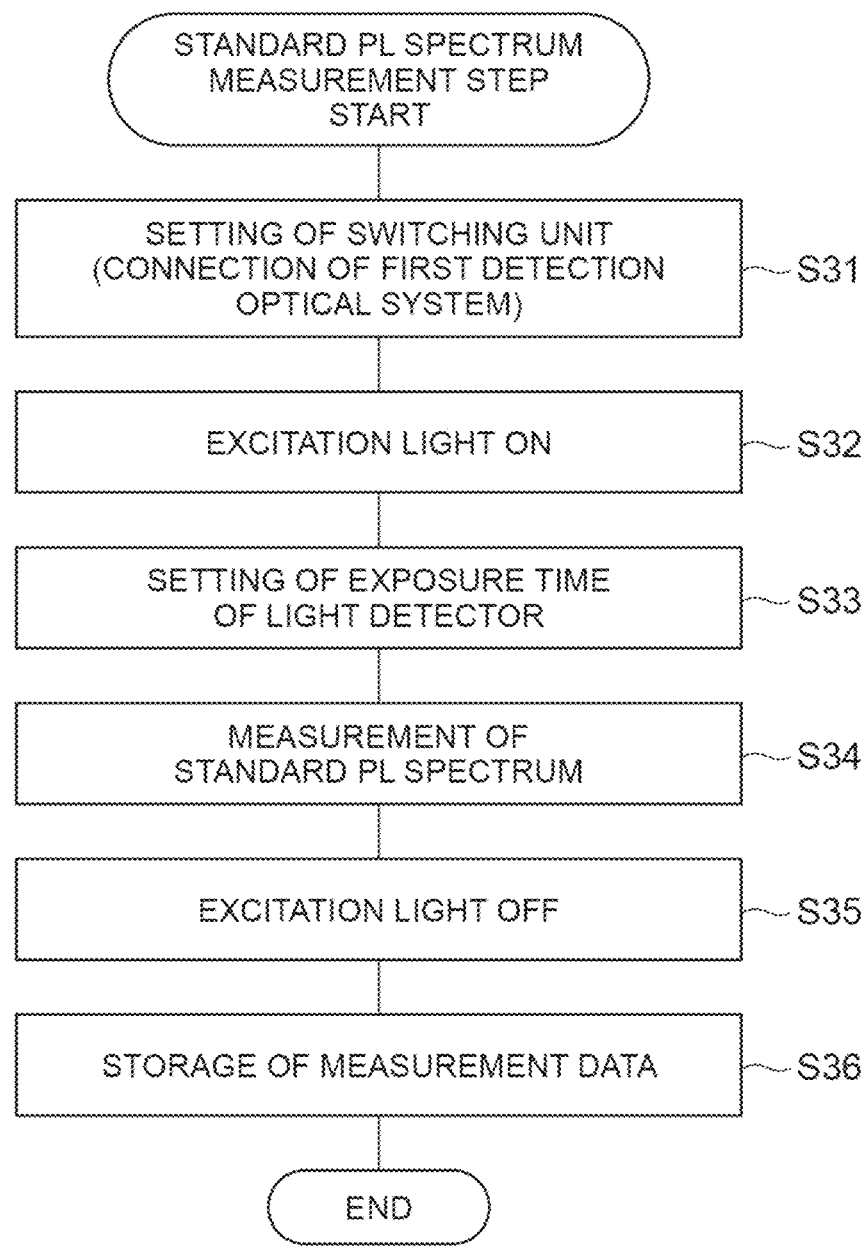
FIG. 12 is a flowchart of a standard PL spectrum measurement step.

In the standard PL spectrum measurement step S03, as shown in FIG. 12, first, setting of the switching unit 31 is performed (step S31). Here, the off-axis parabolic mirror 42 of the switching unit 31 is driven to optically connect the first detection optical system 7 to the light detector 6. Next, the excitation light L1 is output from the excitation light source 2 and the excitation light L1 is incident on the subject to be measured S in the integrating sphere 4 (step S32), and setting of the exposure time of the light detector 6 is performed (step S33). After the exposure time of the light detector 6 is set, the light to be measured L2 output from the first port 24 of the integrating sphere 4 through the irradiation with the excitation light L1 is guided to the light detector 6 by the first detection optical system 7, and the standard PL spectrum measurement of the subject to be measured S is executed (step S34). After the measurement is completed, the output of excitation light is stopped (step S35), and the measurement data is stored (step S36).

Figure 13:
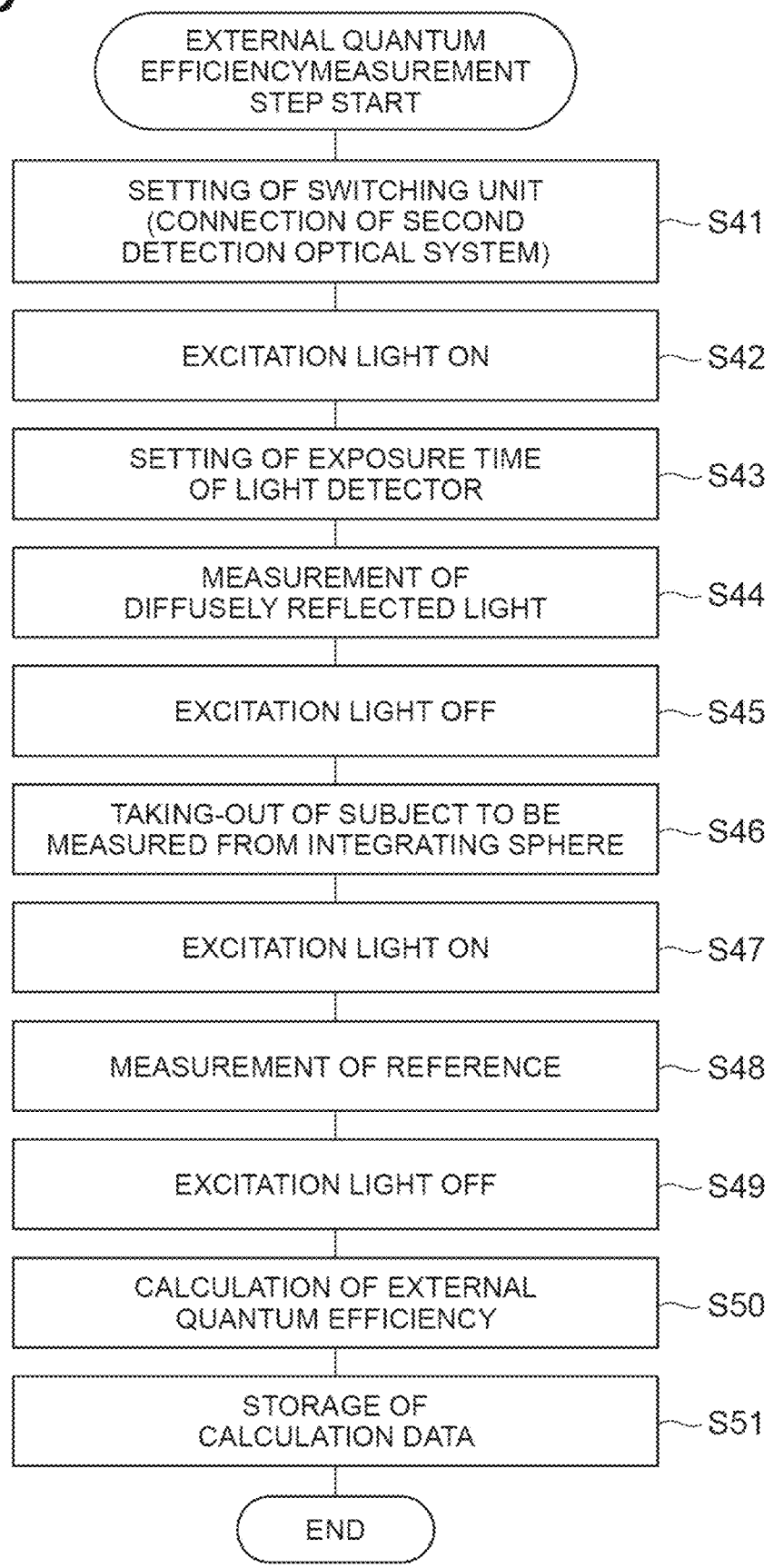
FIG. 13 is a flowchart of an external quantum efficiency measurement step.

In the external quantum efficiency measurement step S04, as shown in FIG. 13, first, setting of the switching unit 31 is performed (step S41). Here, the off-axis parabolic mirror 42 of the switching unit 31 is driven to optically connect the second detection optical system 8 to the light detector 6. Next, the excitation light L1 is output from the excitation light source 2 and the excitation light L1 is incident on the subject to be measured S in the integrating sphere 4 (step S42), and setting of the exposure time of the light detector 6 is performed (step S43). After the exposure time of the light detector 6 is set, the light to be measured L2 output from the second port 25 of the integrating sphere 4 through the irradiation with the excitation light L1 is guided to the light detector 6 by the second detection optical system 8, and the measurement of the diffusely reflected light is executed (step S44). After the measurement is completed, the output of excitation light L1 is stopped (step S45), and the subject to be measured S is taken out from the integrating sphere 4 (step S46).

After the subject to be measured S is taken out, the output of the excitation light L1 is started again (step S46), and reference measurement is executed (step S47). In the reference measurement, in a state where the subject to be measured S is not disposed in the integrating sphere 4, the light to be measured L2 output from the second port 25 of the integrating sphere 4 is guided to the light detector 6 by the second detection optical system 8, and the measurement of the diffusely reflected light is executed (step S48). After the measurement is completed, the output of the excitation light L1 is stopped (step S49). After that, on the basis of the measurement result of step S44 and the measurement result of step S48, the ratio of the number of luminescence photons emitted to the outside of the subject to be measured S to the number of photons of the excitation light L1 absorbed by the subject to be measured S is calculated. As a result, the external quantum efficiency of the subject to be measured S is calculated (step S50), and the calculation data is stored (step S51).

Figure 14:
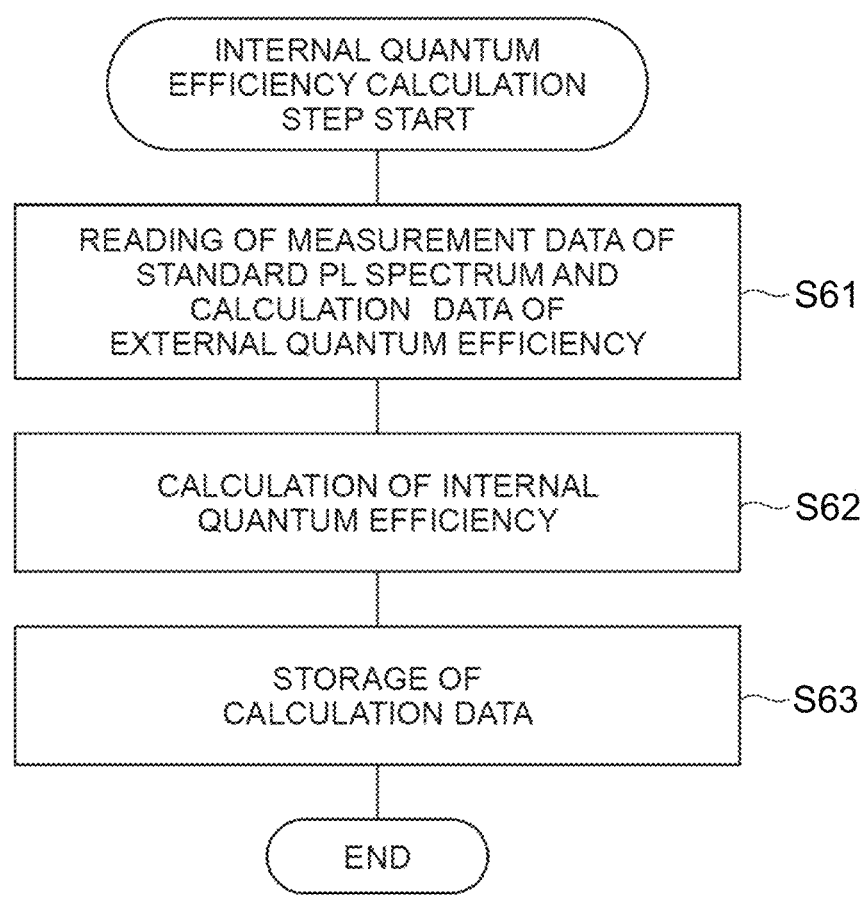
FIG. 14 is a flowchart of an internal quantum efficiency calculation step.

In the internal quantum efficiency calculation step S05, as shown in FIG. 14, the measurement data of the standard PL spectrum stored in step S36 and the calculation data of the external quantum efficiency stored in step S51 are read (step S61). Next, the internal quantum efficiency of the subject to be measured S is calculated on the basis of the measurement data of the read standard PL spectrum measurement, the read calculation data of the external quantum efficiency, and the light extraction efficiency of the subject to be measured S which is known according to the material (step S62). The calculation data is stored, and the process is completed (step S63).

[Operation and Effect of Measurement Device]

As described above, in the measurement device 1, the light transmission member 45 included in the illumination optical system 10 forms the peripheral spot region Ld in the second color different from the first color around the central spot region Lc in the subject to be measured S irradiated with the illumination light L3. Therefore, by aligning the irradiation spot La of the excitation light L1 with the central spot region Lc of the illumination light L3 in advance, it is possible to observe the irradiation spot La of the excitation light L1 on the subject to be measured S in the field of view without irradiating the subject to be measured S with the excitation light L1. With this configuration, since the chances of irradiating the subject to be measured S with the excitation light L1 other than during measurement can be reduced, even in a case where the excitation light L1 is light having relatively high energy such as ultraviolet light, it is possible to suppress the deterioration of the subject to be measured S due to the irradiation with the excitation light L1. Further, since the peripheral spot region Ld that surrounds the central spot region Lc is formed in the second color different from the first color, observation of the entire image of the subject to be measured S is also facilitated.

In the present embodiment, the light transmission member 45 is constituted by the colored pinhole with the central region 51 open. In this case, even in a case where the size of the central spot region Lc is reduced, the manufacturing of the light transmission member is facilitated. Further, in the light transmission member 45, since the peripheral region 52 is provided in an annular shape around the central region 51, the visibility of the irradiation spot La of the excitation light L1 on the subject to be measured S is enhanced.

Modification Examples

Figure 15:
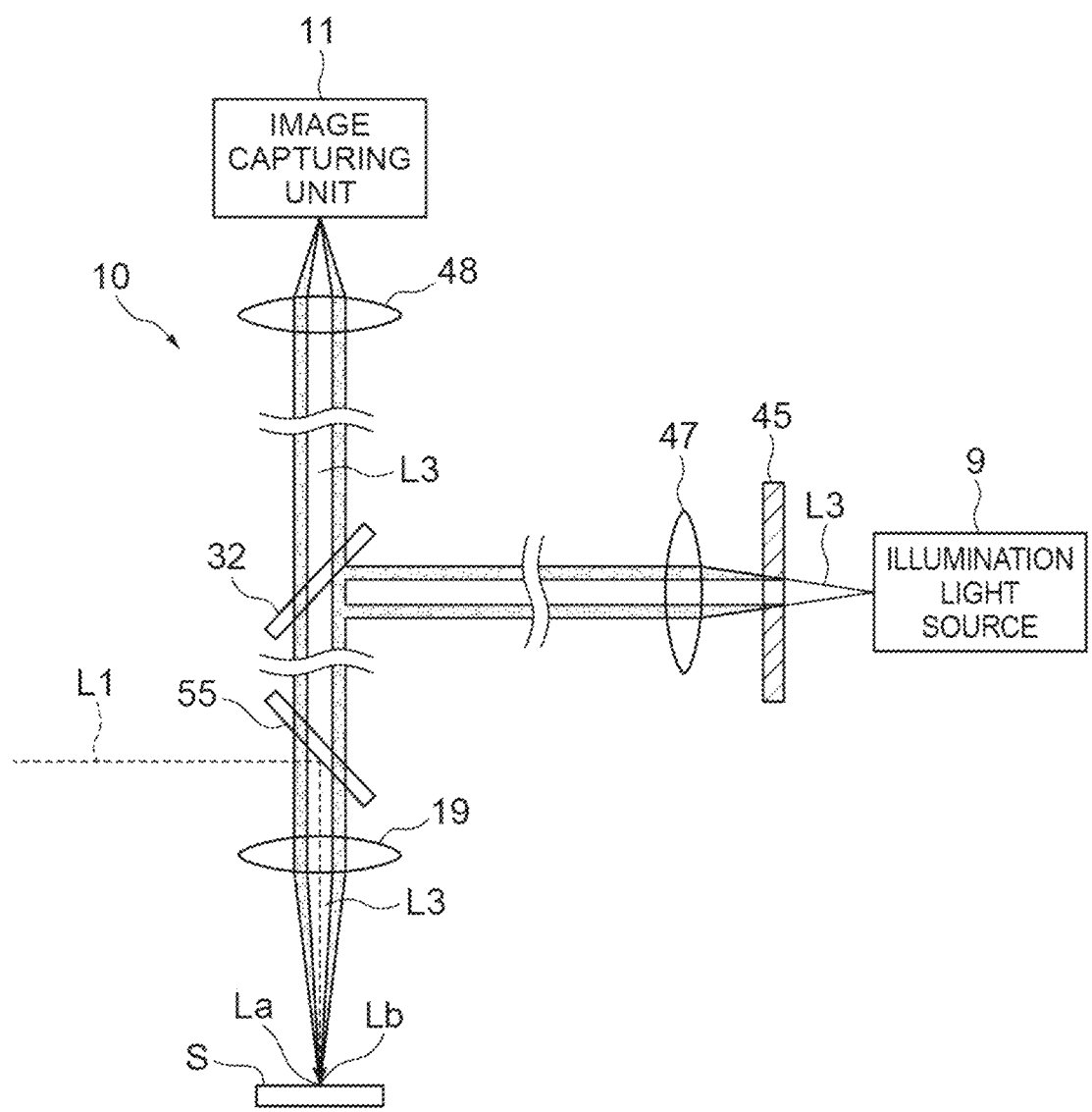
FIG. 15 is a schematic view showing a modification example of the optical connection state between the excitation optical system and the illumination optical system.

The present disclosure is not limited to the above embodiment. For example, in the above embodiment, the measurement device 1 for inspecting the distribution of structural defects and the quantification of defects in a semiconductor wafer by ODPL measurement has been illustrated, but the present disclosure can be applied to another measurement device having an excitation optical system that guides excitation light toward a subject to be measured. Another measurement device is not necessarily limited to a device with an integrating sphere. Examples of such another measurement device include a fluorescence microscope, a photoluminescence measurement device, and the like. In the above embodiment, as shown in FIG. 8(a), the optical axis of the excitation light L1 directed toward the integrating sphere 4 obliquely intersects with the optical axis of the illumination light L3 directed toward the integrating sphere 4, but in another measurement device, for example, as shown in FIG. 15, the optical axis of the excitation light L1 directed toward the subject to be measured S and the optical axis of the illumination light L3 directed toward the subject to be measured S may match each other using a dichroic mirror 55.

Various modifications can also be adopted for the light transmission member 45 that forms the central spot region Lc and the peripheral spot region Ld on the subject to be measured S. For example, in the example of FIG. 7, the light transmission member 45 is constituted by the colored pinhole 53 with the central region 51 open, but the central region 51 may be formed of, for example, colorless acrylic instead of the pinhole space. Even in such a configuration, it is possible to observe an irradiation spot La of the excitation light L1 on the subject to be measured S in the field of view without irradiating the subject to be measured S with the excitation light L1.

Figure 16:
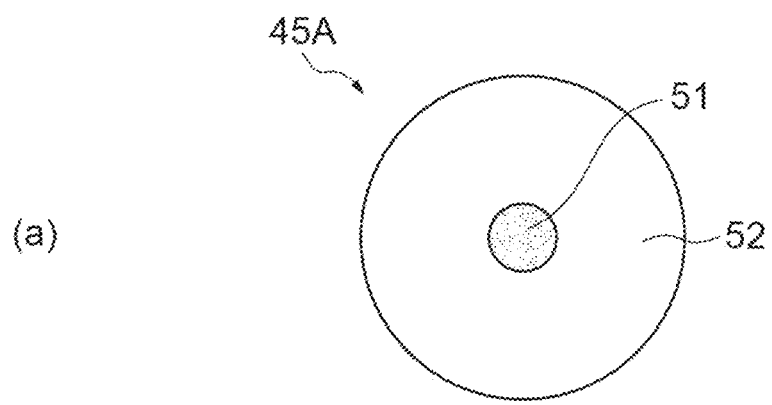
FIGS. 16(a) to 16(c) are schematic views showing modification examples of a light transmission member.
Figure 16:
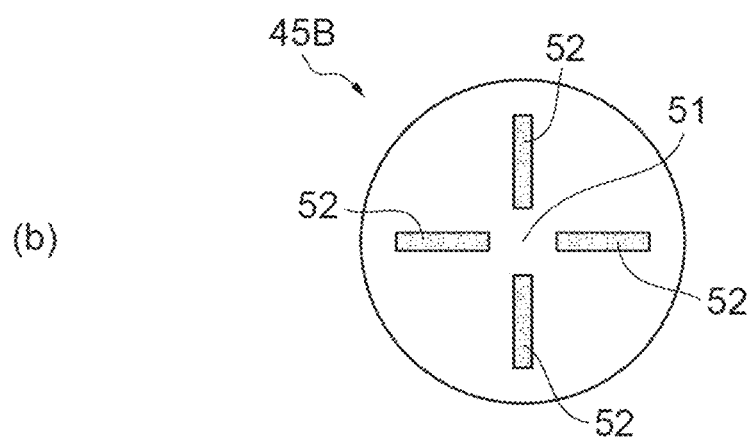
Figure 16:
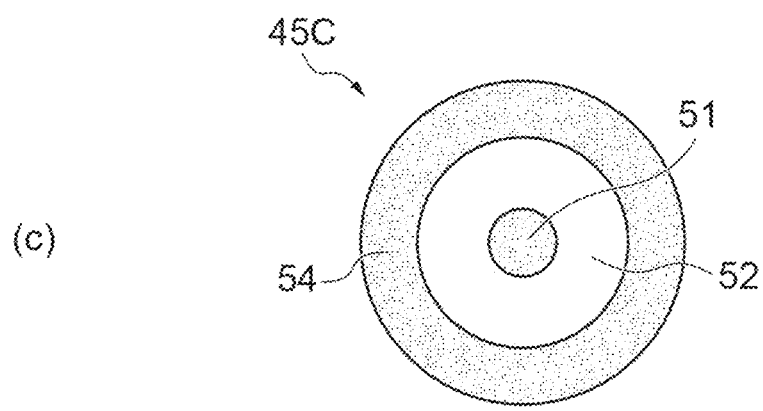

The arrangement pattern of the central region 51 and the peripheral region 52 of the light transmission member 45 may also be modified in various ways. For example, like a light transmission member 45A shown in FIG. 16(a), an annular peripheral region 52 having a second color may be disposed around a circular central region 51 having a first color. For example, like a light transmission member 45B shown in FIG. 16(b), a peripheral region 52 having a second color which extends in a radial direction from a circular central region 51 having a first color may be disposed around the central region 51. In the example of FIG. 16(b), four strip-shaped peripheral regions 52 are disposed around the central region 51 at a phase angle of 90°. With these configurations, it is possible to sufficiently ensure the visibility of the illumination spot Lb of the illumination light L3 when observing the irradiation spot La of the excitation light L1 on the subject to be measured S in the field of view.

In addition, for example, like a light transmission member 45C shown in FIG. 16(c), the light transmission member 45C may further have a peripheral region 54 that has a third color different from the second color and surrounds the peripheral region 52. In this case, since the peripheral region 54 is further expanded outside the peripheral region 52, it becomes easier to observe the entire image of the subject to be measured S. The third color imparted to the peripheral region 54 may be the same as the first color or may be different from the first color.

Figure 17:
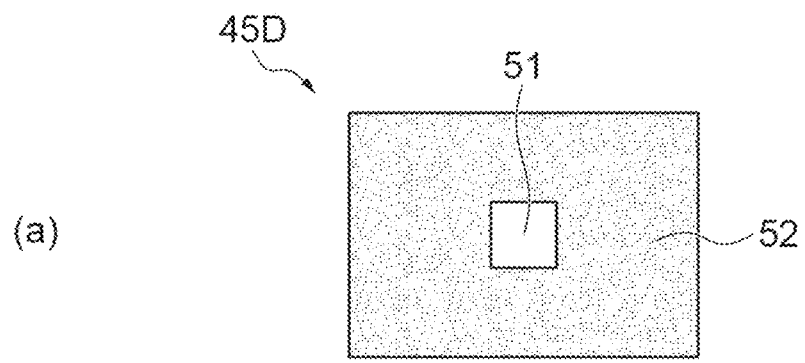
FIGS. 17(a) to 17(c) are schematic views showing other modification examples of the light transmission member.
Figure 17:
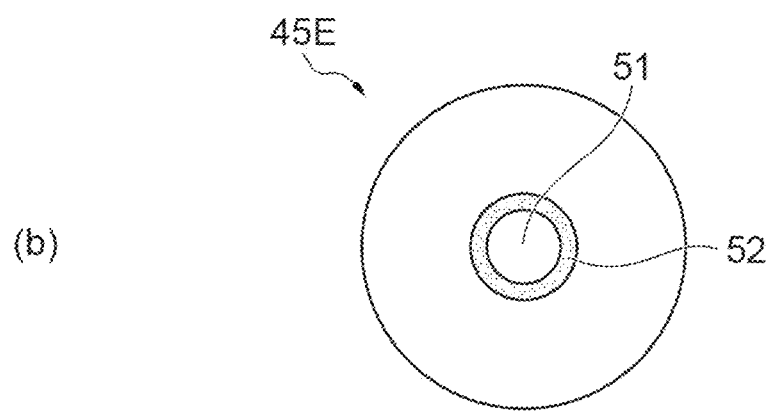
Figure 17:
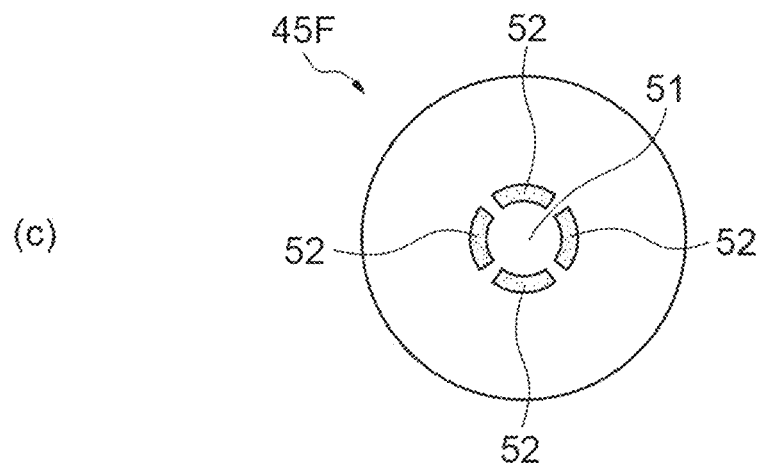

For example, like a light transmission member 45D shown in FIG. 17(a), the shapes of a central region 51 and a peripheral region 52 may match the shape of the image capturing region of the image capturing unit 11. In the example of FIG. 17(a), the image capturing region of the image capturing unit 11 (a pixel region of the image capturing element that constitutes the image capturing unit 11) is rectangular. Corresponding to this, the shapes of both the central region 51 and the peripheral region 52 are rectangular. With such a configuration, the shape of the central region 51 is the same as the shape of the image captured by the image capturing unit 11, and thus it is easy to observe the entire image capturing region.

For example, like a light transmission member 45E shown in FIG. 17(b), a peripheral region 52 may be disposed only at a boundary portion with a central region 51. Further, like a light transmission member 45F shown in FIG. 17(c), a peripheral region 52 disposed at a boundary with the central region 51 may be discontinuous in a circumferential direction. In the example of FIG. 17(c), the peripheral region 52 is divided into four parts in the circumferential direction of the light transmission member 45F. In these configurations as well, it is possible to sufficiently ensure the visibility of the illumination spot Lb of the illumination light L3 when observing the irradiation spot La of the excitation light L1 on the subject to be measured S in the field of view.

REFERENCE SIGNS LIST

1 Measurement device
3 Excitation optical system
10 Illumination optical system
11 Image capturing unit
45, 45A to 45F Light transmission member
51 Central region
53 Colored pinhole
52, 54 Peripheral region
L1 Excitation light
La Irradiation spot
Lb Illumination spot
Lc Central spot region
Ld Peripheral spot region
S Subject to be measured

The invention claimed is:
1. A measurement device comprising:
an excitation optical system configured to guide excitation light toward a subject to be measured;

an illumination optical system configured to form an illumination spot of illumination light on the subject to be measured; and an image capturing unit configured to capture an image of the illumination spot on the subject to be measured, wherein the illumination optical system includes a light transmission member having a central region that has a first color and a peripheral region that has a second color different from the first color and surrounds the central region, and wherein the excitation optical system and the illumination optical system are optically connected to each other such that, in a field of view of the image capturing unit, an irradiation spot of the excitation light on the subject to be measured is included in a central spot region of the illumination light that has passed through the central region and is surrounded by a peripheral spot region of the illumination light that has passed through the peripheral region.

2. The measurement device according to claim 1, wherein the light transmission member is a colored pinhole with the central region open.

3. The measurement device according to claim 1, wherein the peripheral region is annularly provided around the central region.

4. The measurement device according to claim 1, wherein shapes of the central region and the peripheral region match a shape of an image capturing region in the image capturing unit.

5. The measurement device according to claim 1, wherein the light transmission member further has a peripheral region that has a third color different from the second color and surrounds the peripheral region.

* * * * *